Dec. 25, 1951  H. H. MERWIN  2,579,750
SHEARING MACHINE
Filed Dec. 1, 1949  7 Sheets—Sheet 1

FIG. 1

INVENTOR
H. H. MERWIN
BY
W. C. Parnell
ATTORNEY

Dec. 25, 1951     H. H. MERWIN     2,579,750
SHEARING MACHINE
Filed Dec. 1, 1949     7 Sheets-Sheet 2

INVENTOR
H. H. MERWIN
BY
ATTORNEY

Dec. 25, 1951  H. H. MERWIN  2,579,750
SHEARING MACHINE
Filed Dec. 1, 1949  7 Sheets-Sheet 5

FIG. 4

INVENTOR
H. H. MERWIN
BY
W. E. Parnell
ATTORNEY

Dec. 25, 1951  H. H. MERWIN  2,579,750
SHEARING MACHINE

Filed Dec. 1, 1949  7 Sheets-Sheet 7

INVENTOR
H. H. MERWIN
BY
ATTORNEY

Patented Dec. 25, 1951

2,579,750

UNITED STATES PATENT OFFICE 2,579,750

SHEARING MACHINE

Harry H. Merwin, Rutherford, N. J., assignor to Western Electric Company, Incorporated, New York, N. Y., a corporation of New York Application December 1, 1949, Serial No. 130,445

9 Claims. (Cl. 164—42)

This invention relates to shearing machines and more particularly to machines for shearing longitudinally advancing material into predetermined lengths.

In reclaiming certain of the materials from used or rejected sheathed cables, the first step is to remove the sheath. In one type of cable provided with a polyethylene sheath, it has been found advantageous, upon removing the sheath, to flatten it as the sheath is fed between advancing rolls and to shear it into predetermined short lengths so that they may be readily received in a suitable receptacle.

An object of the invention is to provide a shearing machine which is simple in structure and highly efficient in shearing material into predetermined lengths.

With this and other objects in view, the invention comprises a machine for shearing longitudinally advancing material into given lengths including a main shearing blade movable back and forth across the back of the material and having opposing shearing edges to cooperate with companion shearing elements which are alternately moved into shearing position whereby portions will be cut from the material during each movement of the main shearing blade. More specifically, a piston of a fluid operable unit is connected to the main shearing blade for actuation thereof while a mechanism is operated by movement of the cylinder of the unit to alternately move the companion shearing elements into shearing position, the companion elements being supported by an arm normally urged toward the main shearing blade to create an efficient shearing action between the cutting edges of the main shearing blade and the companion shearing elements.

Other objects and advantages will be apparent from the following detailed description when considered in conjunction with the accompanying drawings, wherein

Fig. 6 is an enlarged fragmentary sectional view of a portion of the machine shown in Fig. 1 illustrating the position of the main shearing blade at the bottom of its stroke while Fig. 1 shows the main shearing blade at the top of its stroke.

Referring now to the drawings, the main shearing blade 10, provided with upper and lower shearing edges 11 and 12, is pivotally supported at 14 within a frame 15 of the machine. A rod 16, connected to a piston (not shown) within a cylinder 17 of a fluid operated unit, has its upper end provided with a yoke 18 straddling the main shearing blade 10 and pivotally connected thereto at 19. An adjustable stop is provided to limit the downward movement of the main shearing blade. In the present embodiment of the invention, this stop is composed of adjustable nuts 21 on a threaded element 22 extending through an aperture 23 in the housing 15 and having its lower end mounted in a member 24 pivotally connected at 25 to the main shearing blade 10.

Figure 1:
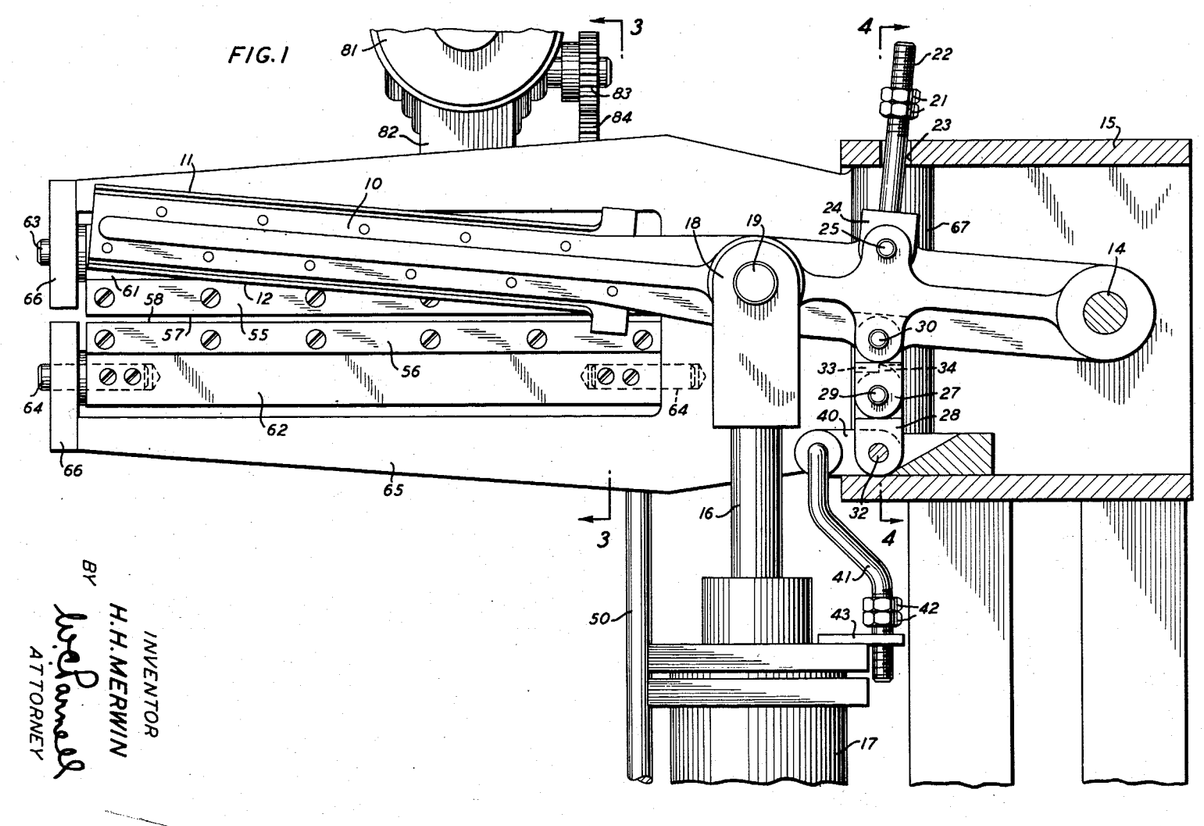
Fig. 1 is a fragmentary front elevational view of the shearing machine.
Figure 4:
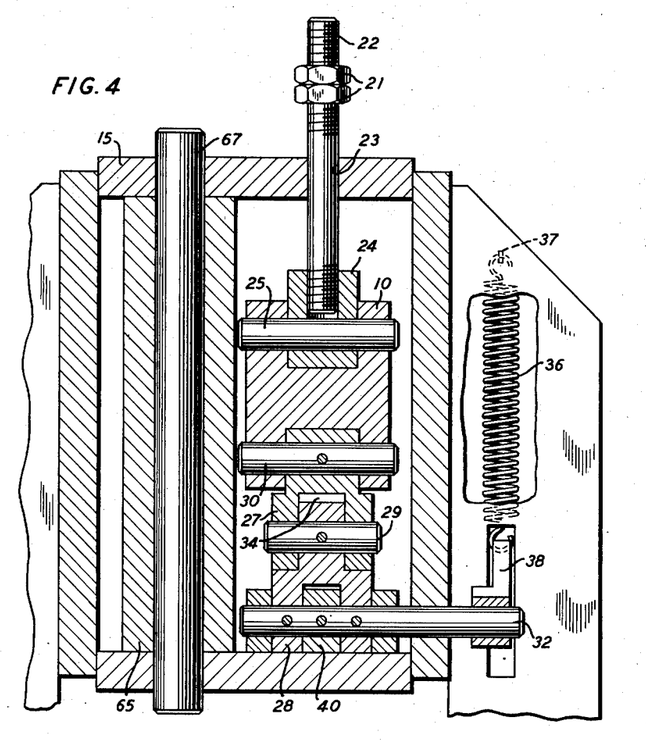
Fig. 4 is an enlarged vertical sectional view taken along the line 4—4 of Fig. 1.

Means is provided to latch the main shearing blade in its upper position, as shown in Fig. 1, until the companion shearing elements have been actuated or shifted for the downward movement of the blade. This latching means includes companion links 27 and 28 pivotally connected to each other at 29 (Figs. 1 and 4). The upper link 27 is pivotally connected at 30 to the main shearing blade 10 while the lower end of the link 28 is pivotally supported by a rocking shaft 32 and secured thereto whereby rocking movement of the shaft will cause actuation of the link 28. The links 27 and 28 are provided with extending portions 33 and 34, respectively to abut each other when in the position shown in Fig. 1 to hold the links on or beyond dead center whereby they will function as a rigid arm to latch the main shearing blade 10 in the position shown in Fig. 1 until the cylinder 17 moves upwardly a given distance to actuate the links into open position. Furthermore, a spring 36 having one end fixed at 37 and the other end connected to a lever 38 mounted on the outer end of the rocking shaft 32 normally urges the links into the holding position shown in Figs. 1 and 4. Another lever 40 is mounted on the rocking shaft 32, has a push rod 41 pivotally secured to the outer end thereof as shown in Fig. 1. The lower end of the push rod 41 is threaded to support adjustable nuts 42 relative to a bracket 43 mounted on the cylinder 17 and movable therewith whereby a given upward movement of the cylinder will cause the push rod 41 to rock the shaft 32 to unlatch the main shearing blade 10.

Figure 1A:
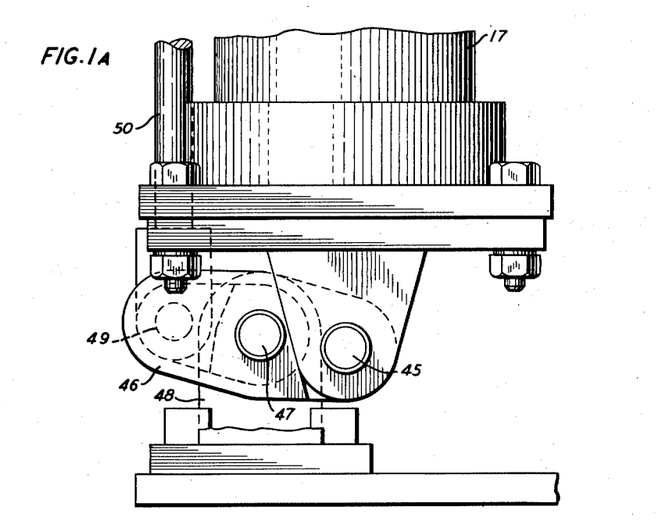
Fig. 1a is a fragmentary front elevational view of the lower portion of the machine which is not shown in Fig. 1.
Figure 7:
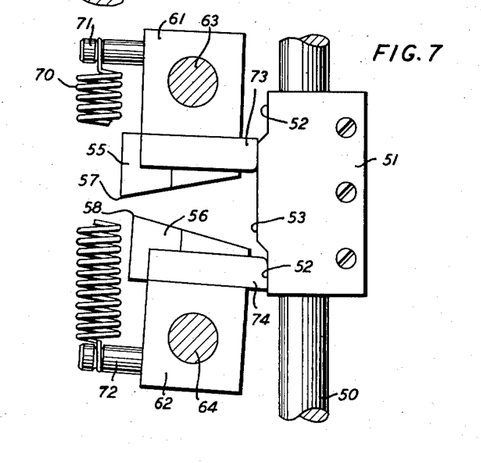
Fig. 7 is a fragmentary detailed view of the control means for the companion shearing elements.

In Fig. 1a it will be noted that the cylinder 17 is pivotally supported at 45 on one end of a lever 46 which is pivotally supported at 47 intermediate its ends within a stationary bracket 48. The other end of the lever 46 is pivotally connected at 49 to a vertically extending push rod 50 which has a cam 51 (Fig. 7) mounted thereon with low portions 52 and an intermediate high portion 53.

Figure 2:
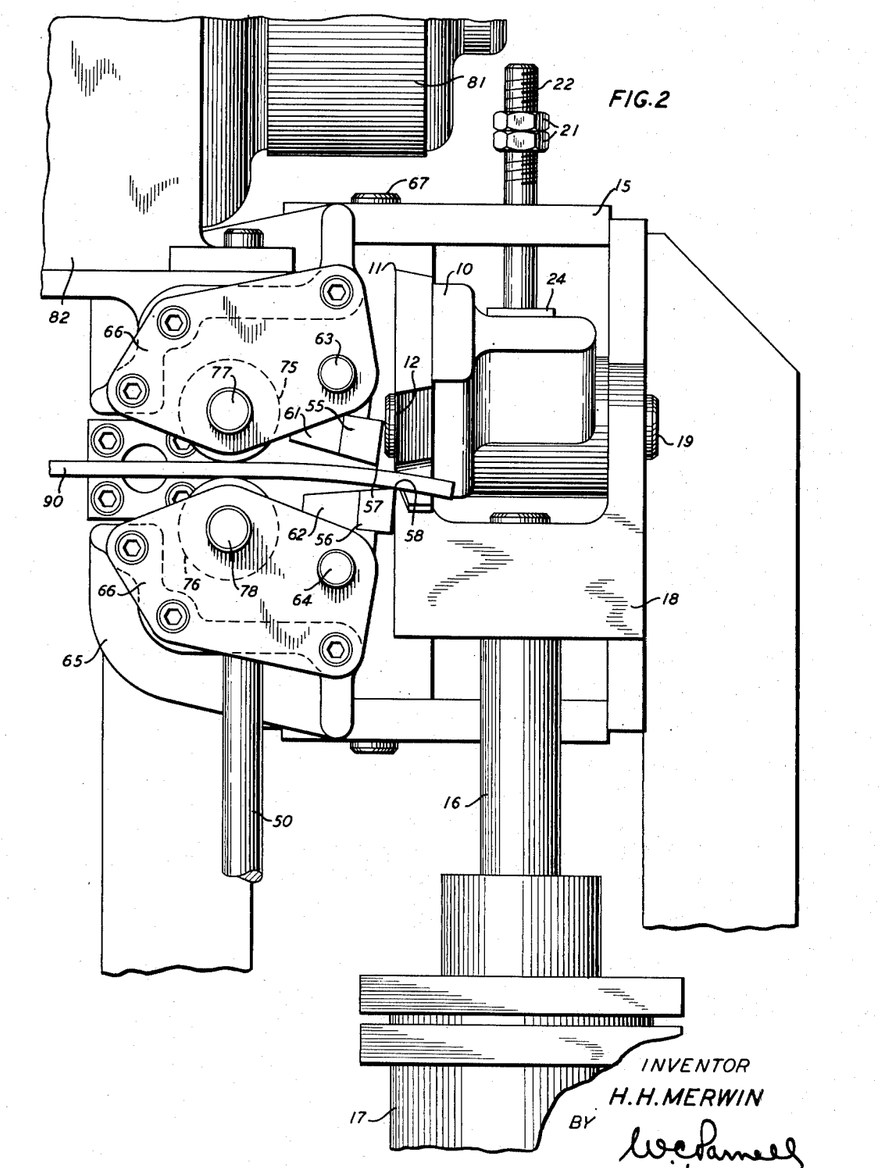
Fig. 2 is an end elevational view of the machine looking from the left of Fig. 1.
Figure 3:
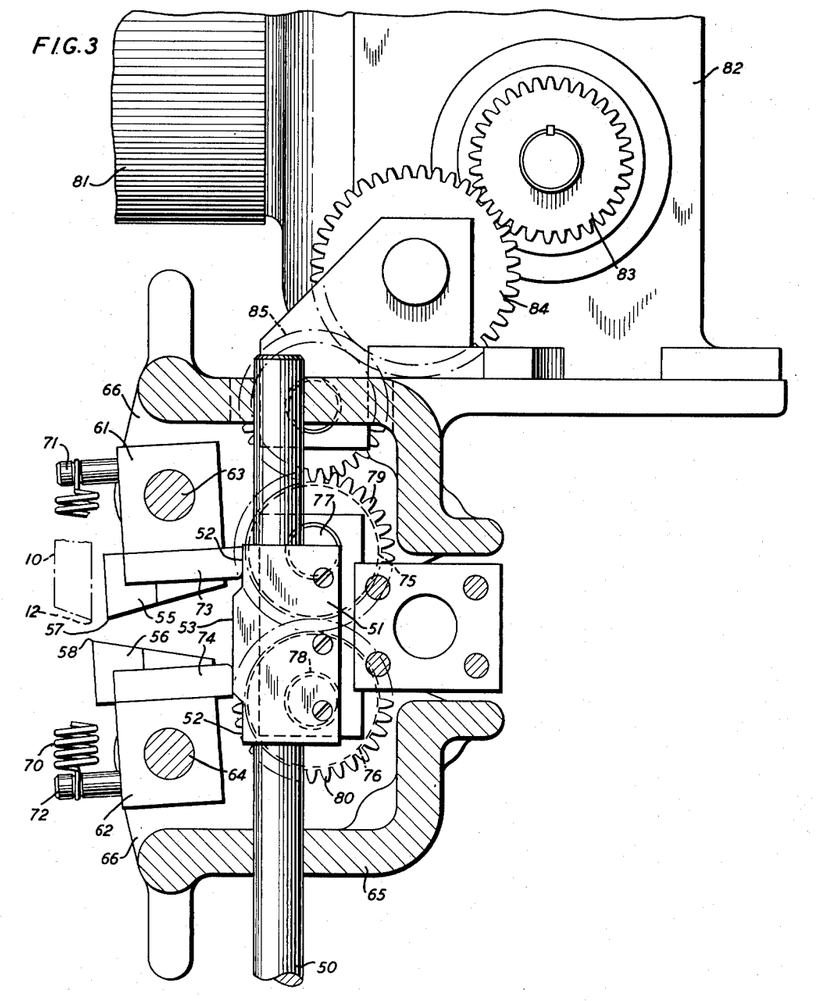
Fig. 3 is an enlarged vertical sectional view taken along the line 3—3 of Fig. 1.
Figure 5:
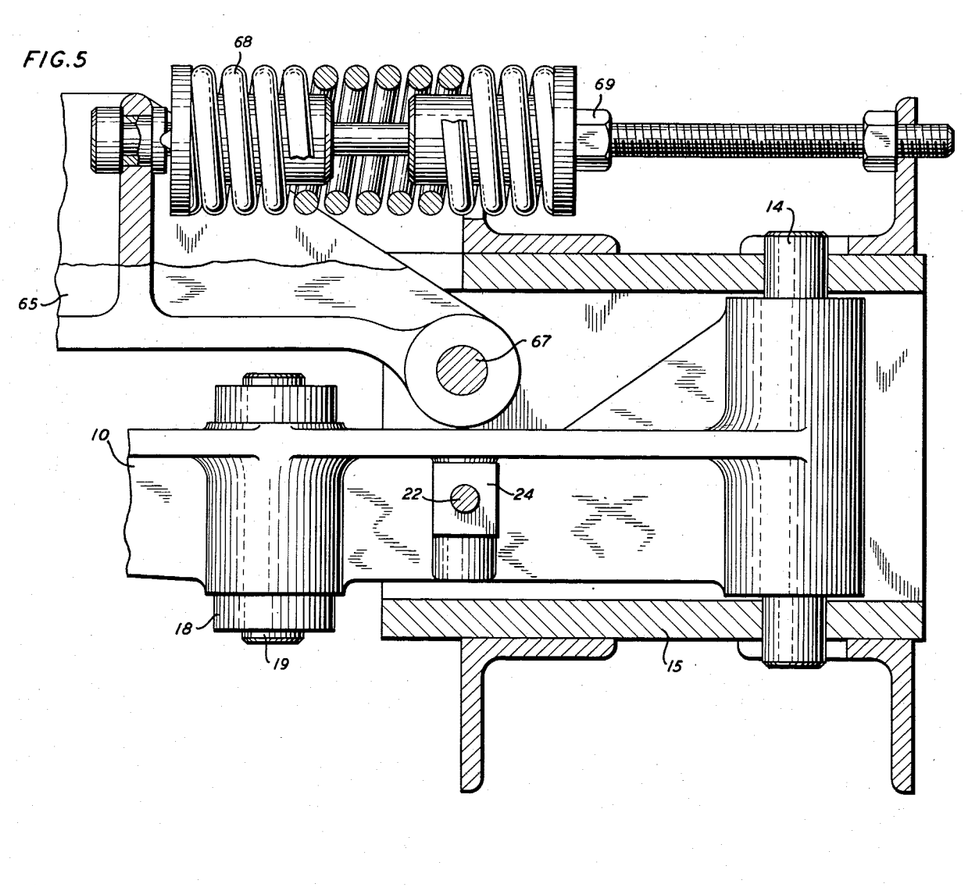
Fig. 5 is an enlarged fragmentary sectional view of a portion of a machine.

Attention is now directed to the companion shearing elements 55 and 56 having shearing edges 57 and 58 alternately movable into engagement with the shearing edges 11 and 12 respectively of the main shearing blade 10. The shearing elements 55 and 56 are mounted in holders 61 and 62 pivotally supported at 63 and 64 in a main supporting arm 65 and end plates 66 therefor as shown in Figs. 1 and 2. The arm 65 is pivotally supported at 67 in the main frame of the machine, attention being directed to Fig. 5 and is normally urged toward the main shearing blade 10 by a spring 68, the force of which may be varied by adjusting the nut 69. The holders 61 and 62 are normally urged toward each other about their pivots 63 and 64 by a spring 70, having its ends connected to pins 71 and 72 of the holders, to constantly force cam engaging portions 73 and 74 of the holders into engagement with the cam 51. When the cam 51 is in the position shown in Fig. 3, the shearing element 56 of the holder 62 is moved outwardly to cause its shearing edge 58 to register with the shearing edge 12 of the main shearing blade. At the same time, the shearing element 55 is allowed to move inwardly and be held in this position by its spring 70.

The arm 65 supports feeding rollers 75 and 76 fixedly mounted on their respective shafts 77 and 78. Interengaging gears 79 and 80 mounted on the shafts 77 and 78 are driven from a motor 81 and a gear reduction unit 82 through gears 83, 84, and 85.

Considering now the operation of the shearing machine, let it be assumed that suitable means is provided to intermittently operate the unit including air cylinder 17 and its piston by alternately admitting a fluid, such as air under pressure to the opposing ends of the cylinder. Furthermore, it is to be understood that the unit is provided with the conventional exhausting means. A material 90 to be sheared into predetermined lengths may be fed between the rollers 75 and 76.

Figure 2A:
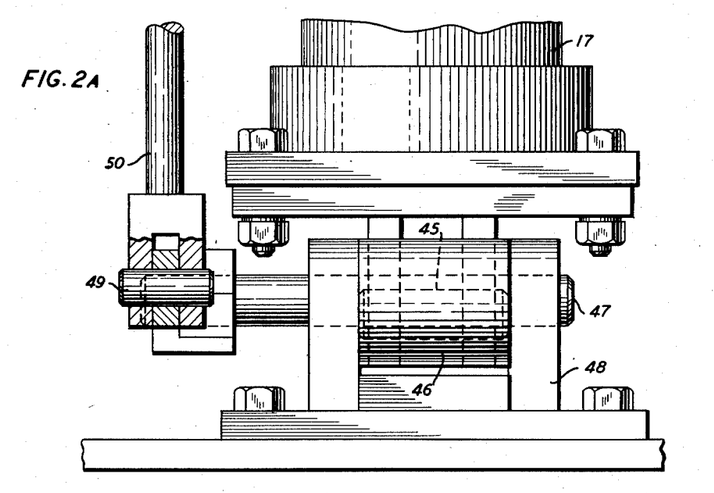
Fig. 2a is a fragmentary end elevational view of the machine showing the lower portion thereof which is not shown in Fig. 2.

With the main shearing blade in the position shown in Fig. 1, and air applied to the top of the cylinder 17 and the piston, tending to move the blade 10 downwardly about its pivot 14, the first action to take place is the upward movement of the cylinder, as the blade is being held against downward movement. Near the end of the upward movement of the cylinder 17 the bracket 43 (Fig. 1) will engage the nuts 42, pushing the rod 41 upwardly to move the lever 46 to rock the shaft 32 against the force of the spring 36, to disengage the main shearing blade. However, during the first portion of the upward movement of the cylinder 17, the lever 46 (Figs. 1a and 2a) will be rocked to pull the rod 50 downwardly from the position shown in Fig. 3 to the position shown in Fig. 7 causing the cam 51 to move the shearing element 56 outwardly and freeing the shearing element 55 for movement inwardly relative to the main shearing element 10, moving the shearing edge 58 into shearing position and the shearing edge 57 out of shearing position. This takes place before the main shearing blade 10 is released for at that moment, the force applied to the piston will move the main shearing blade about its pivot causing the shearing edges 12 and 58 to shear a given length from the material 90.

Figure 6:
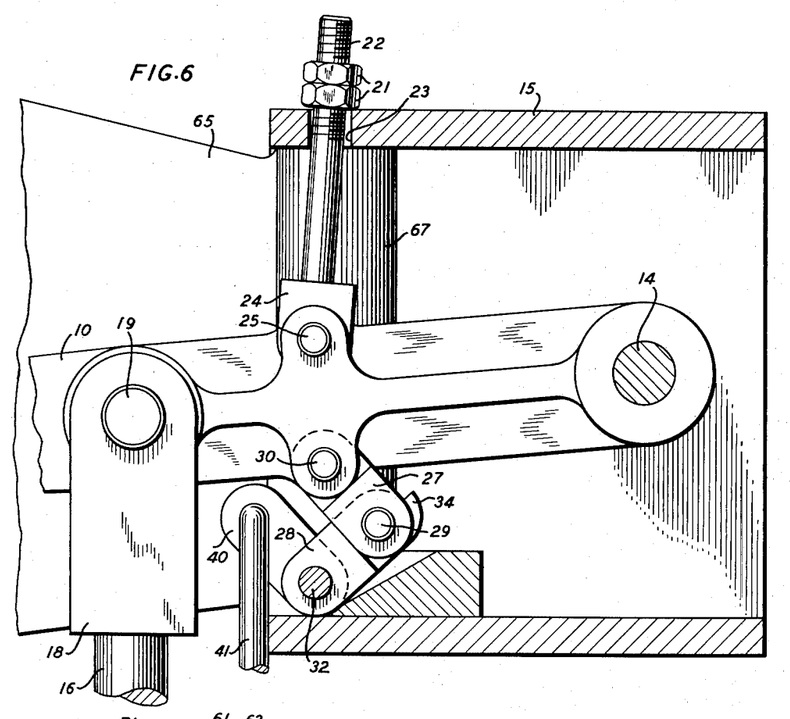

During the next action of the machine, a latching means is not necessary to hold the main shearing blade against movement until the companion shearing elements have been shifted. This is due to the weight of the main shearing blade tending to hold it downwardly and the weight of the cylinder tending to move downwardly of its own weight resulting in the downward movement of the cylinder when air is applied between the cylinder and the bottom of the piston causing upward movement of the cam 51 to shift the positions of the shearing elements 55 and 56 to the positions shown in Fig. 7 before the main shearing blade is moved upwardly. After the shearing elements have been alternated in position, the main shearing blade is moved upwardly through the force of air under pressure beneath the piston cutting another length from the material 90 by the shearing edges 11 and 57. The piston moves the main shearing blade into its uppermost position, moving the links 27 and 28 from the positions shown in Fig. 6 to the latching position shown in Fig. 1 where they are held in place by the spring 36 and released by the next upward movement of the cylinder 17. This operation continues, causing oscillation of the main shearing blade 10 and during each movement thereof back and forth across the material 90, predetermined lengths are cut from the material resulting from the alternate movement of the companion shearing elements into registration with their respective shearing edges of the main cutting blade. In this manner, the material may be rapidly cut into its desired lengths.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A machine for shearing longitudinally advancing material into given lengths comprising a main shearing blade movable back and forth across the path of the material and having opposing shearing edges, movably supported companion shearing elements to cooperate with their respective shearing edges of the main shearing blade to shear the material into predetermined lengths during each movement of the main shearing blade, means normally moving the shearing elements out of shearing position, and mechanisms operable in timed relation with the blade to alternately move the companion shearing elements into shearing positions.

2. A machine for shearing longitudinally advancing material into given lengths comprising a main shearing blade movable back and forth across the path of the material and having opposing shearing edges, movably supported companion shearing elements to cooperate with their respective shearing edges of the main shearing blade to shear the material into predetermined lengths during each movement of the main shearing blade, means normally moving the shearing element out of shearing position, mechanisms operable in timed relation with the shearing blade to alternately move the companion shearing elements into shearing positions, and a mechanism limited in its operation to the cycle of operation of one of the shearing element operating mechanisms to hold the main shearing blade against movement until the said shearing element operating mechanism has been operated.

3. A machine for shearing longitudinally advancing material into given lengths comprising a main shearing blade movable back and forth across the path of the material and having opposing shearing edges, companion shearing elements to cooperate with their respective shearing edges of the main shearing blade to shear the material into predetermined lengths during each movement of the main shearing blade, and a mechanism operable in timed relation with the movement of the shearing blade to cause movement of the shearing elements relative to each other and the main shearing blade to create shearing actions between the shearing elements and their respective shearing edges of the main shearing blade.

4. A machine for shearing longitudinally advancing material into given lengths comprising a main shearing blade movable back and forth across the path of the material and having opposing shearing edges, companion shearing elements to cooperate with their respective shearing edges of the main shearing blade to shear the material into predetermined lengths during each movement of the main shearing blade, and a mechanism operable in timed relation with the movement of the shearing blade to cause movement of the shearing elements relative to each other and the main shearing blade under a predetermined variable force to create shearing actions between the shearing elements and their respective shearing edges of the main shearing blade.

5. A machine for shearing longitudinally advancing material into given lengths comprising a main shearing blade movable back and forth across the path of the material and having opposing shearing edges, companion shearing elements mounted for movement alternately into and out of shearing positions to cooperate with their respective shearing edges of the main shearing blade to shear the material into predetermined lengths during each movement of the main shearing blade, a fluid operated unit including a piston and a cylinder reciprocated in opposing directions by fluid under pressure alternately directed between the ends of the piston and the respective ends of the cylinder, means operatively connecting the piston to the main shearing blade whereby the reciprocation of the piston will cause the back and forth movement of the blade, and connecting mechanisms responsive to the reciprocable movement of the cylinder to alternately move the shearing elements into their shearing positions.

6. A machine for shearing longitudinally advancing material into given lengths comprising a main shearing blade movable back and forth across the path of the material and having opposing shearing edges, companion shearing elements mounted for movement alternately into and out of shearing positions to cooperate with their respective shearing edges of the main shearing blade to shear the material into predetermined lengths during each movement of the main shearing blade, a fluid operated unit including a piston and a cylinder reciprocated in opposing directions by fluid under pressure alternately directed between the ends of the piston and the respective ends of the cylinder, means operatively connecting the piston to the main shearing blade whereby the reciprocation of the piston will cause the back and forth movement of the blade, means responsive to the reciprocable movement of the cylinder to alternately move the shearing elements into their shearing positions, and a latch to hold the main shearing blade against reverse movement until the shearing elements have been moved to position the appropriate shearing element in its shearing position for the shearing edge of the main shearing blade to perform the next shearing operation on the material.

7. A machine for shearing longitudinally advancing material into given lengths comprising a main shearing blade movable back and forth across the path of the material and having opposing shearing edges, companion shearing elements mounted for movement alternately into and out of shearing positions to cooperate with their respective shearing edges of the main shearing blade to shear the material into predetermined lengths during each movement of the main shearing blade, a fluid operated unit including a piston and a cylinder reciprocated in opposing directions by fluid under pressure alternately directed between the ends of the piston and the respective ends of the cylinder, means operatively connecting the piston to the main shearing blade whereby the reciprocation of the piston will cause the back and forth movement of the blade, means responsive to the reciprocable movement of the cylinder to alternately move the shearing elements into their shearing positions, a latch to hold the main shearing blade against reverse movement until the shearing elements have been moved to position the appropriate shearing element in its shearing position for the shearing edge of the main shearing blade to perform the next shearing operation on the material, and a trip mechanism to release the latch after the shearing elements have been moved.

8. A machine for shearing longitudinally advancing material into given lengths comprising a main shearing blade movable back and forth across the path of the material and having opposing shearing edges, companion shearing elements mounted for movement alternately into and out of shearing positions to cooperate with their respective shearing edges of the main shearing blade to shear the material into predetermined lengths during each movement of the main shearing blade, a fluid operated unit including a piston and a cylinder reciprocated in opposing directions by fluid under pressure alternately directed between the ends of the piston and the respective ends of the cylinder, means operatively connecting the piston to the main shearing blade whereby the reciprocation of the piston will cause the back and forth movement of the blade, means responsive to the reciprocable movement of the cylinder to alternately move the shearing elements into their shearing positions, a latch to hold the main shearing blade against reverse movement until the shearing elements have been moved to position the appropriate shearing element in its shearing position for the shearing edge of the main shearing blade to perform the next shearing operation on the material, and a mechanism responsive to the movement of the cylinder to trip the latch after the shearing elements have been moved.

9. A machine for shearing longitudinally advancing material into given lengths comprising a main shearing blade movable back and forth across the path of the material and having opposing shearing edges, companion shearing elements mounted for movement alternately into and out of shearing positions to cooperate with their respective shearing edges of the main shearing blade to shear the material into predetermined lengths during each movement of the main shearing blade, a fluid operated unit including a piston and a cylinder reciprocated in opposing directions by fluid under pressure alternately directed between the ends of the piston and the respective ends of the cylinder, means operatively connecting the piston to the main shearing blade whereby the reciprocation of the piston will cause the back and forth movement of the blade, a cam actuable to alternately move the shearing elements into their shearing positions, and means responsive to the movement of the cylinder to actuate the cam.

HARRY H. MERWIN.

REFERENCES CITED

The following references are of record in the file of this patent:

UNITED STATES PATENTS

| Number | Name | Date |
|---|---|---|
| 1,714,785 | Hudson | May 28, 1929 |
| 2,258,348 | Biggert | Oct. 7, 1941 |